US011390499B2

United States Patent
Auvinen et al.

(10) Patent No.: US 11,390,499 B2
(45) Date of Patent: Jul. 19, 2022

(54) CRANE AND WORK MACHINE

(71) Applicant: PONSSE OYJ, Vieremä (FI)

(72) Inventors: Toni Auvinen, Vieremä (FI); Marko Halonen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 488 days.

(21) Appl. No.: 16/456,316

(22) Filed: Jun. 28, 2019

(65) Prior Publication Data
US 2019/0315604 A1    Oct. 17, 2019

Related U.S. Application Data

(63) Continuation-in-part of application No. PCT/FI2017/050962, filed on Dec. 29, 2017.

(30) Foreign Application Priority Data

Dec. 30, 2016   (FI) ..................................... 20166052

(51) Int. Cl.
*B66C 23/42*     (2006.01)
*B60P 1/54*      (2006.01)
(Continued)

(52) U.S. Cl.
CPC ............ *B66C 23/42* (2013.01); *B60P 1/5433* (2013.01); *B66C 1/68* (2013.01); *A01D 75/002* (2013.01); *A01G 23/097* (2013.01)

(58) Field of Classification Search
CPC ..... B60P 1/5433; B60P 1/5423; B60P 1/5428; B66C 1/68
See application file for complete search history.

(56) References Cited

U.S. PATENT DOCUMENTS 3,129,821 A * 4/1964 Graham ................ B60P 1/5433
                                                    414/543
3,404,792 A * 10/1968 Frieberg ............... B60P 1/5433
                                                    414/555
(Continued)

FOREIGN PATENT DOCUMENTS

CN            80435 C      5/1991
CN          1270031 C      8/2006
(Continued)

OTHER PUBLICATIONS

International Preliminary Report on Patentability of PCT/FI2017/050962 dated Apr. 5, 2019.
(Continued)

*Primary Examiner* — Jonathan Snelting
(74) *Attorney, Agent, or Firm* — FisherBroyles, LLP; Robert Kinberg

(57) ABSTRACT

A crane arrangement includes a base, a pillar boom, a lifting boom, a folding boom, a lifting cylinder, and a folding cylinder. The lifting boom includes a first pivot point for connecting the pillar boom to the lifting boom, a second pivot point for connecting the lifting cylinder to the lifting boom, and a third pivot point for connecting the folding cylinder to the lifting boom. The lifting boom further includes a hollow cast connecting piece arranged at the first end of the lifting boom, in which connecting piece at least the first pivot point and second pivot point are arranged. The invention also relates to a corresponding work machine.

18 Claims, 12 Drawing Sheets

(51) Int. Cl.
    *B66C 1/68* (2006.01)
    *A01D 75/00* (2006.01)
    *A01G 23/097* (2006.01)

(56) References Cited

U.S. PATENT DOCUMENTS

| | | | | |
|---|---|---|---|---|
| 3,591,025 | A | * | 7/1971 | Perrott ................... B60P 1/483 |
| | | | | 414/731 |
| 4,769,977 | A | | 9/1988 | Milbourn |
| 5,486,084 | A | * | 1/1996 | Pitman ................. B60P 1/5433 |
| | | | | 188/171 |
| 5,490,755 | A | * | 2/1996 | Billotte ................. B60K 17/14 |
| | | | | 180/24.03 |
| 5,975,832 | A | * | 11/1999 | Winkler ............... A01D 90/083 |
| | | | | 212/247 |
| 2003/0126772 | A1 | | 7/2003 | Masumoto et al. |
| 2009/0078667 | A1 | | 3/2009 | Oyamada et al. |
| 2010/0232918 | A1 | | 9/2010 | Endou et al. |
| 2017/0042100 | A1 | | 2/2017 | Voss |

FOREIGN PATENT DOCUMENTS

| | | |
|---|---|---|
| CN | 102616674 A | 8/2012 |
| CN | 107635907 A | 1/2018 |
| DE | 7015853 U | 8/1970 |
| DE | 19958696 A1 | 6/2001 |
| EP | 2987399 A1 | 2/2016 |
| FI | 50091 C | 9/1975 |
| KR | 101597976 B1 | 3/2016 |
| RU | 2564059 C2 | 9/2015 |
| SE | 318382 B | 12/1969 |

OTHER PUBLICATIONS

International Search Report of PCT/FI2017/050962 dated Mar. 14, 2018.
Written Opinion of PCT/FI2017/050962 dated Mar. 14, 2018.
First Chinese Office Action in corresponding Chinese Patent Application No. 201780087638.5, dated Apr. 2, 2020, 16 pages with English translation.
Finnish Search Report in corresponding Finnish Patent Application No. 20166052, dated Jul. 18, 2017, 4 pages with Google English Translation.
Russian Search Report in related Russian Patent Application No. 2019123836, date of completion of search Feb. 8, 2021, 2 pages in English.

* cited by examiner

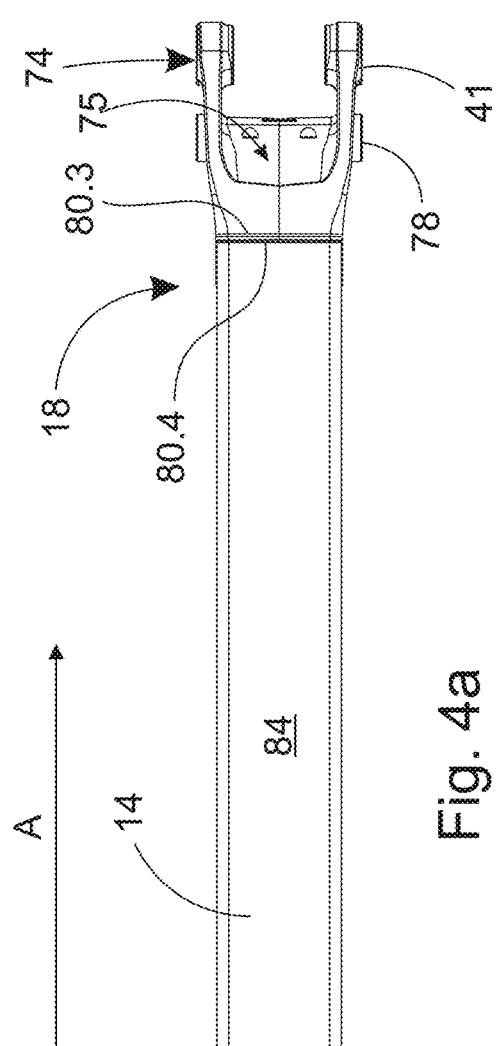
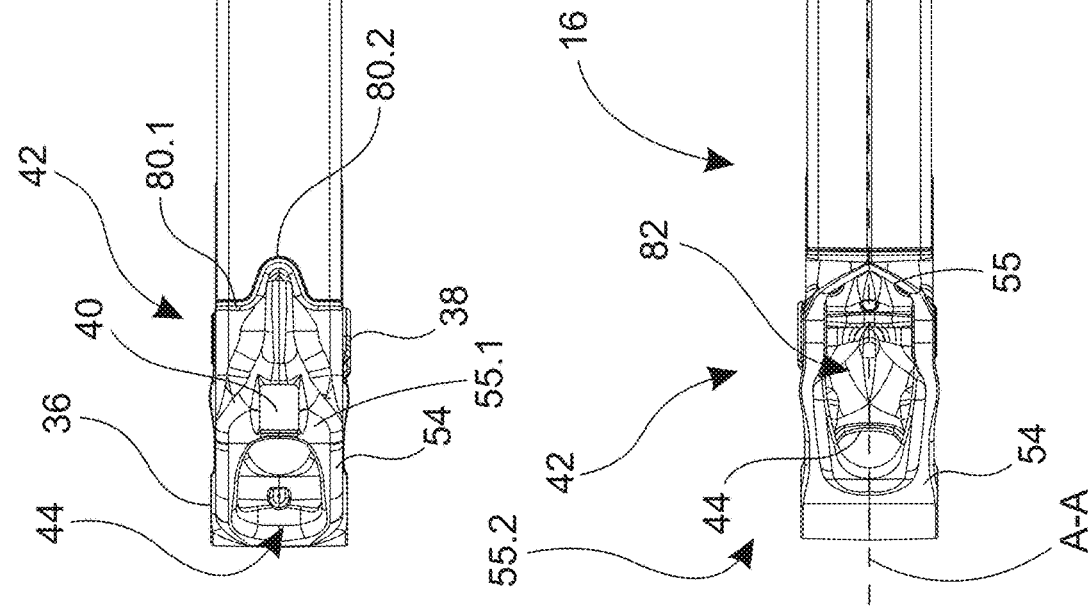
Fig. 4a
Fig. 4b

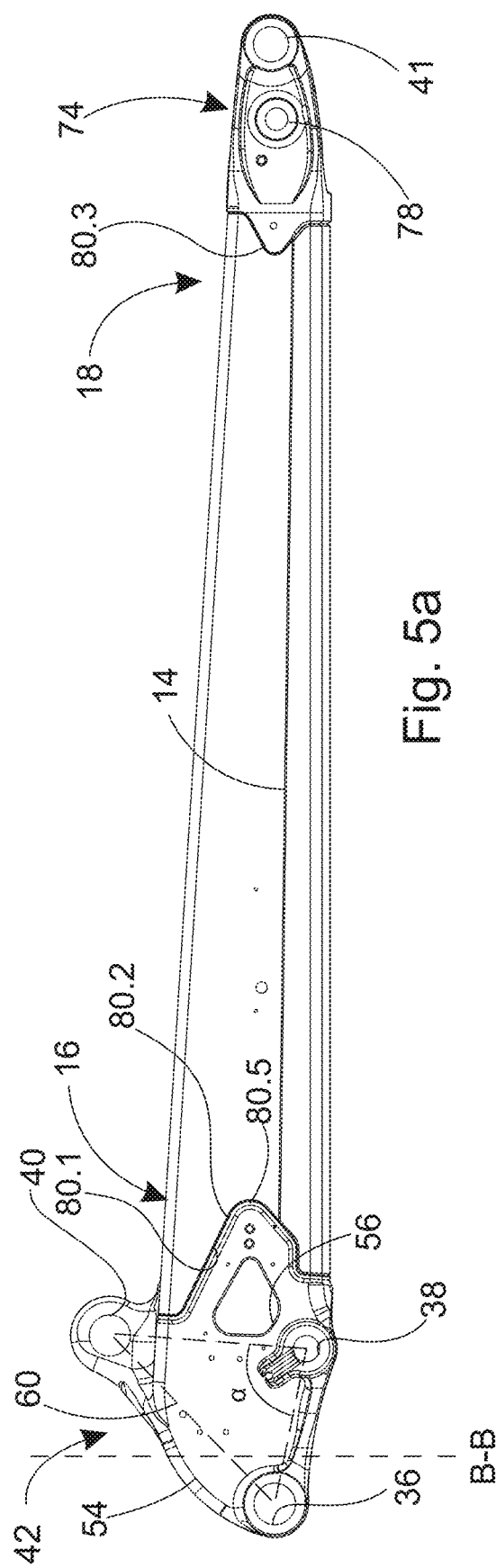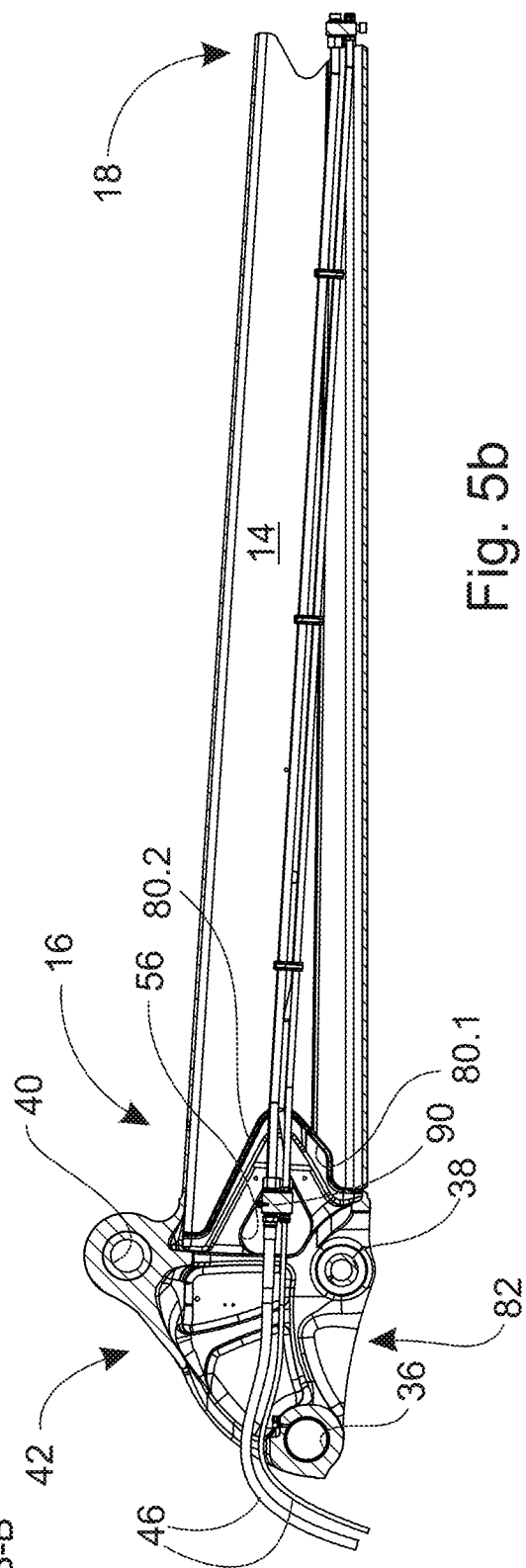

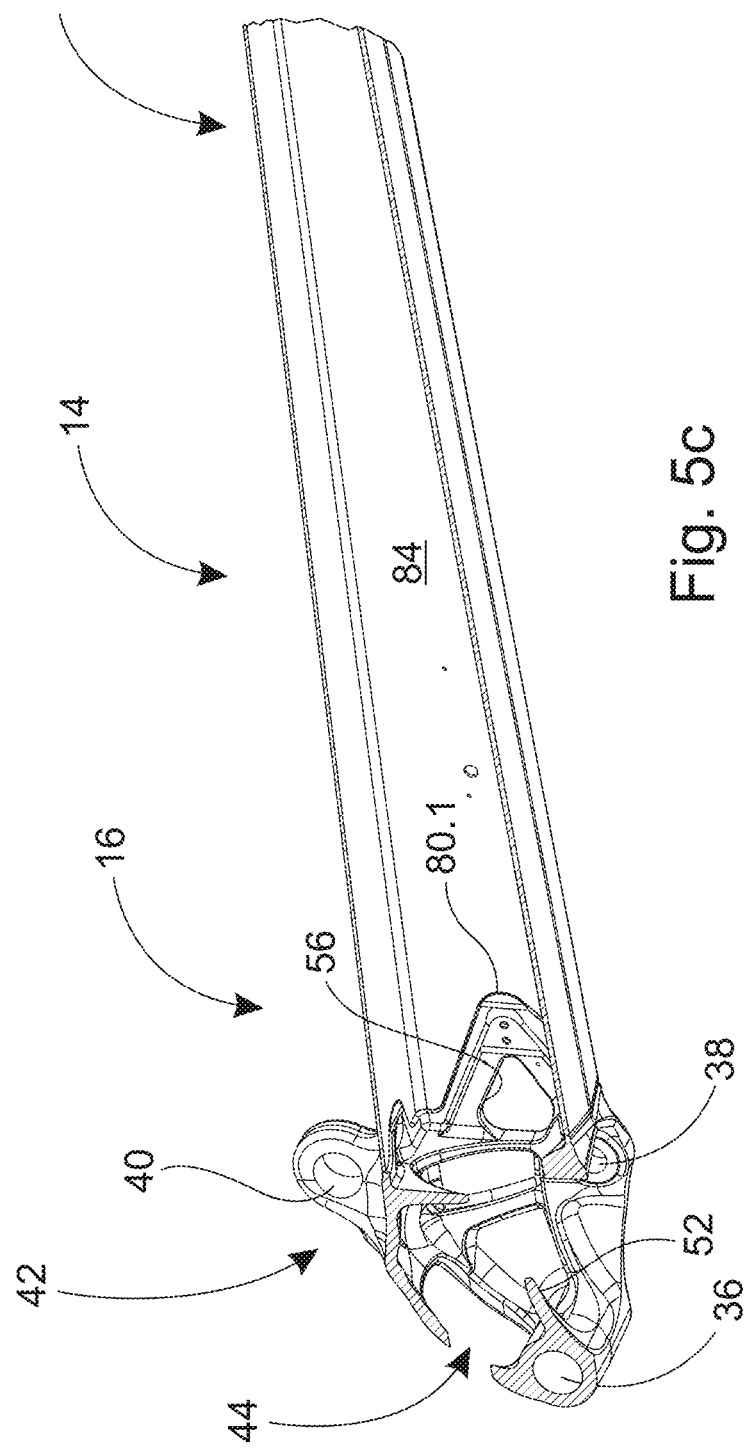

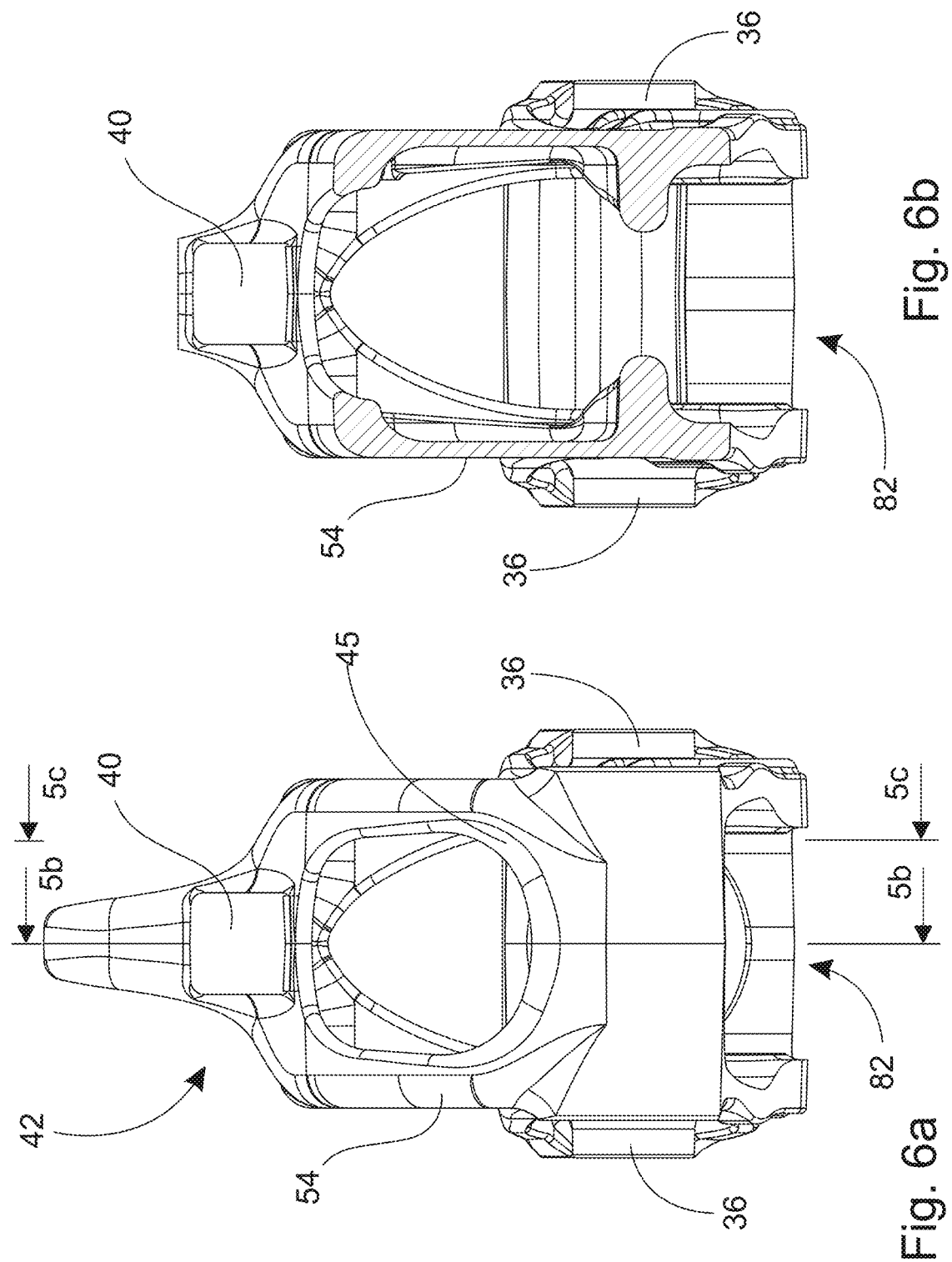

CRANE AND WORK MACHINE

CROSS-REFERENCE TO RELATED APPLICATIONS

This application is a continuation-in-part application of International Patent Application No. PCT/FI2017/050962, filed Dec. 29, 2017, which claims benefit of Finland Patent Application No. 20166052, filed Dec. 30, 2016.

FIELD OF THE INVENTION

The invention relates to a crane arrangement, including: a base for attaching a crane to a work machine; a pillar boom attached rotatably to the base; a lifting boom comprising a first end and a second end pivoted at the first end to the pillar boom; a folding boom comprising two ends, the folding boom being pivoted at the second end to the lifting boom, in order to suspend a tool from the crane; a lifting cylinder comprising a third end and a fourth end, pivoted at the third end to the pillar boom and at the fourth end to the lifting boom, in order to operate the lifting boom; and a folding cylinder comprising a fifth end and a sixth end, the folding cylinder being pivoted at the fifth end to the lifting boom and at the sixth end to the folding boom, in order to operate the folding boom, wherein the lifting boom includes a first pivot point for connecting the pillar boom to the lifting boom and receiving moments acting on the lifting boom, a second pivot point for connecting the lifting cylinder to the lifting boom, and a third pivot point for connecting the folding cylinder to the lifting boom. The invention also relates to a corresponding work machine.

BACKGROUND OF THE INVENTION

In connection with work machines, cranes are used to load different objects onto the load space of the work machine and unload them from the load space of the work machine. For example, cranes are used in connection with forest machines for lifting trees. For the crane to be able to perform diverse lifting with variable paths of movement in often cramped environments, the crane generally includes at least two, often three consecutively pivoted parts, which form the set of booms of the crane. For example, in Ponsse Oy's crane 10 using lifting booms and marketed under the product name K90+, shown in FIG. 1a, there is a base 110 for attaching the crane 10 to the chassis of the work machine, and three consecutively pivoted parts, which form a set of booms 11, i.e. a pillar boom 12, a lifting boom 14, and a folding boom 20. In order to move the booms 12, 14, and 20, there are operating devices 24 and 30 between the booms 12, 14, and 20, which create movement in the booms 12, 14, and 20 around the pivot points 36 and 41 between the booms 12, 14 and 20. In addition, the crane includes rotation cylinders 114, with the aid of which the pillar boom 12 can be rotated around its longitudinal axis relative to the base 110. The crane 10 also includes its own pivot points 38, 40', 37, and 39 for pivoting the operating devices 24 and 30 between the booms 12, 14, and 20. A corresponding construction also appears in the cranes Mesera 92F/92FT 86i manufactured by the Finnish company Mesera Cranes Finland Oy. The folding boom often also includes a telescopic extension, which can be used to alter the reach of the set of booms with the aid of a linear movement.

FIG. 1a shows a crane according to the prior art. It should, however, be understood that, although the details of cranes of the prior art vary between manufacturers, particularly the cranes and cranes' sets of booms used particularly in forwarders from different manufacturers have very largely the same basic construction. The basic construction of cranes has become established and practically no real development has occurred in their geometry.

A problem in the aforementioned cranes is that the pivot points 36, 38, and 40' in the first end 16 of the lifting boom 14 are implemented with the aid of cuts 70 in the structure of the lifting boom 14. Such a construction requires a great deal of welding seam, which increases the possibility of manufacturing errors. On the other hand, also the third pivot point 40' of the operating device 30 between the lifting boom 14 and the folding boom 20 is far from the two other pivot points 36 and 38 in the first end 16 of the lifting boom 14, thus increasing the size of the structure to be welded. This also leaves the area of the lifting boom 14 between the third pivot point 40' and the first pivot point 36 exposed to the bending forces caused by the load at the end of the folding boom 20. The bending forces gradually cause fatigue in the material, finally leading to fractures in the structure of the lifting boom 14 and thus shortening the operating life of the crane 10. In addition, the welded seams cause residual stresses in the structure of the lifting boom while the heat exchange in the material, caused by welding, leads in turn to a partial loss of the strength properties of the materials. Further, making the welded joints is a laborious and time-consuming work stage, which also requires a competent workman.

SUMMARY OF THE INVENTION

The invention is intended to create a crane that is more durable and easily manufactured than the cranes of the prior art. The invention is also intended to create a more reliable work machine than work machines of the prior art.

The crane according to the invention is characterized by a crane, which includes a base for attaching the crane to a work machine, a pillar boom attached rotatably to the base, a lifting boom comprising a first end, a second end and a hollow cast connecting piece arranged at the first end of the lifting boom, the lifting boom being pivoted at the first end to the pillar boom and a folding boom comprising two ends, the folding boom being pivoted at the second end of the lifting boom to suspend a tool from the crane. In addition, the crane includes a lifting cylinder comprising a third end and a fourth end, the lifting cylinder being pivoted at the third end in connection with the pillar boom and at the fourth end to the lifting boom to operate the lifting boom and a folding cylinder comprising a fifth end and a sixth end, the folding cylinder being pivoted at the fifth end to the lifting boom and at the sixth end to the folding boom to operate the folding boom. The lifting boom comprises a first pivot point connecting the pillar boom to the lifting boom and receiving moments acting on the lifting boom, a second pivot point connecting the lifting cylinder to the lifting boom, and a third pivot point connecting the folding cylinder to the lifting boom, wherein at least the first pivot point and the second pivot point and the third pivot point are arranged to the connecting piece and the connecting piece includes an opening for routing conductors through the connecting piece and into the lifting boom.

In cranes according to the invention, the arranging of the pivot points in the cast connecting piece permits the lifting boom to be implemented using fewer welded structures in the pivot points, which facilitates the manufacture of the crane and improves its durability. In the cast piece, the loadings between the pivot points can be lead to the cast piece internally, so that there are no welded seams between the pivot points or at the most highly stressed points. In addition, the cast connecting piece is extremely stiff and is able to withstand effectively the moments acting on the lifting boom. With the aid of the opening, the conductors can be led into the lifting boom without separate openings formed afterwards in the structure of the lifting boom, which would weaken the structure. The arranging of the pivot points in the cast connecting piece permits openings to be formed in the connecting piece, so that hoses can be routed through the connecting piece and inside the boom and through the interior of the boom to the end of the lifting boom.

The third pivot point too is preferably arranged in the connecting piece. The forces acting on the pivot points can then all be directed to the same cast and stiff connecting piece, so that the structure of the lifting boom can be lighter than previously. Thus the tubular beam part of the lifting boom can be implemented without large point loads. This in turn permits the tubular-beam portion of the lifting boom to be implemented using as much as 10-25% thinner materials.

Preferably the second pivot point and third pivot point are arranged relative to a line running between the first pivot point and the pivot point of the folding boom belonging to the second end of the lifting boom, in such a way that the intersection point of the line segment perpendicular to the line running through the second pivot point is located on a line at a distance from the intersection point of the line segment perpendicular to the line running through the third pivot point, which distance is 0-20%, preferably 8-15% of the length of the line, in order to equalize the loading of the crane. By arranging the pivot points relative to each other as described above, the loadings are optimized, as the third pivot point, used to attach the folding cylinder to the lifting boom, moves closer to the first end of the lifting boom.

The principle in the placing of the pivot points in the connecting piece is that the pivot points are located in the cast connecting piece in a way that minimizes the loading of the portion of the connecting piece between the second pivot point and the third pivot point and optimizes the loading of the portion of the connecting piece between the first pivot point and the third pivot point, or optimizes the length of the portion between the first and third pivot points.

The pillar boom preferably includes a fork for attaching the pillar boom to the first pivot point around the connecting piece. Thus the lifting boom is supported on the pillar boom over a sufficiently wide space, thus creating a good moment support.

Preferably the intersection point of the line segment perpendicular to a line running through the third pivot point and the intersection point of a line segment perpendicular to a line running through the second pivot point are located at a distance of 1-20% of the length of the line, defined in the direction of the first pivot point. The pivot points can then be locate close to each other, thus reducing the loadings acting on the connecting piece. The said intersection point are preferably located over a distance of 5-15% of the length of the line, defined from the direction to the first pivot point, again to create a more optimal loading.

The second pivot point is preferably located on the opposite side of the line to the third pivot point, relative to the said line. This too reduces the loadings acting on the connecting piece.

The opening is preferably arranged in the connecting piece between the first pivot point and the third pivot point, the surface of the opening in the connecting piece being parallel to the axes of rotation of the pivot points. In other words, the opening is formed in the end of the lifting boom, but not, however, in the sides of the connecting piece, so that the lifting boom is open at its first end, permitting the conductors coming from the pillar boom to be easily placed and routed through the connecting piece and into the lifting boom.

Preferably the opening is round and has rounded edges. The round shape does not have any corners wherein the conductors might get stuck and the rounded edges ensure that any motion of the conductors against the edges of the opening do not cause damage to the conductors.

In addition to the pivot points, the connecting piece preferably includes side walls, which are parallel to the longitudinal direction of the lifting boom and perpendicular in plane relative to the axes of rotation of the pivot points. The side walls are load-bearing elements in the connecting piece. The connecting piece's side walls can also be arranged at a slant to the axis of rotation of the pivot points, so that the width of the connecting piece changes relative to the height of the pillar boom.

The connecting piece preferably comprises side walls, both of which have at least two support structures between the pivot points, each of which support structures connects at least two pivot points to each other on the same side wall. In other words, each structure connects at least one of the following: the first pivot point to the second pivot point, the first pivot point to the third pivot point, the second pivot point to the third pivot point, in order to transmit forces. With the aid of the support structures, the loadings between the pivot point can be transmitted between the pivot points, thus minimizing bending between the pivot points in each side wall of the connecting piece.

According to a first embodiment, the connecting piece is a unified cast piece. It can then be implemented completely without welded seams or other joints, so that it is structurally extremely durable. In addition, the manufacture of the connecting piece is simple compared to a welded sheet-metal structure consisting of many parts, and the cast piece can be made in a single individual work stage.

According to a second embodiment, the connecting piece is formed by combining at least two cast pieces. Casting as two pieces facilitates the casting event of the cast pieces, but on the other hand requires the cast pieces to be combined to form the connecting piece, requiring welding or other joining means.

The connecting piece can include side walls and second openings on both side walls of the connecting piece for handling and connecting the connectors of the conductors to the lines containing in the lifting boom. Thus the connection and tightening of the connectors is easy and can be easily performed through the second opening without special tools.

The first pivot point, the second pivot point, and the third pivot point can be placed in the connecting piece in such a way that a triangle is created between the pivot points when the lifting boom is seen from the direction of the axis of rotation of the pivot points, which the triangle's largest angle $\alpha$ is at most 120°, preferably 60°, when angle $\alpha$ is at the location of the second pivot point, when the locations of the first pivot point and the third pivot point determine the size of the angle. All three pivot points are then close to each other, so that the size of the cast connecting piece also remains reasonable. This means that the casting of the piece is easier and more economic, with good casting and quality properties.

At the second pivot point, the triangle's angle is preferably 60-100°, most preferably 75-90°. The pivot points are then located very close to each other and the length of the cast connecting piece can be as little as 40-60 cm.

The crane's folding cylinder is preferably extended. Thus the third pivot point can be closer to the first end of the lifting boom as part of a compact connecting piece.

The folding cylinder preferably includes an extension for connecting the folding cylinder to the third pivot point. With the aid of the extension, the folding cylinder can be attached to the third pivot point in the connecting piece at the first end of the lifting boom without increasing the cylinder's displacement.

The lifting boom preferably includes a box-type structure. Thus it can be implemented as a relatively light structure.

Both the connecting piece and the box structure of the lifting boom preferably include connector surfaces for joining the connecting piece and the lifting boom to each other. The connecting piece and the lifting boom are reliably joined with the aid of the connector surfaces.

The connector surfaces in the side walls of the boom between the box structure of the lifting boom and the connecting piece can be sinuous in order to minimize the changes in stiffness. The joint is then made as homogeneous and reliable as possible.

There is preferably an extended transfer cylinder in the work machine. With the aid of the extended transfer cylinder the folding boom can be attached directly to the connecting piece of the lifting boom of the crane, though the third pivot point is located farther than usual from the folding boom.

According to one embodiment, the crane includes a lifting grab for gripping a tree, or a processing head for both gripping a tree and processing the tree. For such a purpose the leading of the conductors through the connecting piece can be implemented flexibly, as the conductors' connectors can be tightened through the second openings.

The lifting cylinder preferably includes a jacket and a piston rod, the third end of the lifting cylinder being formed in the piston rod and the fourth end in the jacket, and the folding cylinder includes a second jacket and a second piston rod, the fifth end of the folding cylinder being formed in the second jacket and the sixth end in the second piston rod. Thus sufficiently large forces are created for lifting a heavy load.

The folding boom can be telescopic. In the crane according to the invention a good reach is achieved by means of the telescopic folding boom.

The first pivot point is preferably farther from the pivot point of the folding boom than the second and third pivot points. The lifting of the lifting boom then takes place by extending the lifting cylinder, when its power production is effective.

The length of the connecting piece can be 10-40%, preferably 15-25% of the length of the lifting boom. Its weight then remains reasonable.

The width of the connecting piece at the first pivot point can be 70-100% of the distance between the first and second pivot points. The first pivot point will then be sufficiently wide to effectively withstand the moments acting on the lifting boom.

The width of the connecting piece at the first pivot point can be 5-20%, preferably 10-17% of the length of the lifting boom. The first pivot point will then be sufficiently wide to effectively withstand the moments acting on the lifting boom.

The connecting piece preferably includes a third opening arranged between the first pivot point and the second pivot point, a surface of the third opening in the connecting piece being parallel to axes of rotation of the first pivot point, the second pivot point and the third pivot point wherein the fourth end of the lifting cylinder is attach through the third opening to the second pivot point of the connecting piece of the lifting boom. In other words the connecting piece forms a fork-like structure for the fourth end of the lifting cylinder to attach to the second pivot point of the connecting piece. The purpose of the third opening is also to lighten the structure of the connecting piece as well as function as passage for sand pins used during casting.

The length of the third opening in the length direction of the lifting boom between the first end and the second end is 1.5-3.0-times the length of the fourth end of the lifting cylinder in the length direction of the lifting boom. This enables the fourth end of the lifting cylinder to clear the edges of the third opening without touching them in extreme positions of the lifting boom.

Preferably the third pivot point is lug-shaped. The lug-shaped third pivot point is stronger and easier to manufacture than a fork-type pivot point used in the prior art.

Preferably the lifting boom includes the connecting piece forming the first end of the lifting boom, the box structure having a seventh end and eighth end attached to the connecting piece from the seventh end, and a second connecting piece attached to the eighth end of the connecting piece, the second connecting piece forming the second end of the lifting boom. This enables the more complex connecting piece and second connecting piece to be formed as cast structure while the simple box structure can be a welded sheet metal structure.

Preferably the second connecting piece includes a fourth opening for routing the conductors routed inside the lifting boom through the opening outside the lifting boom.

Preferably the connecting piece is machined so that the thickness of the side walls of the connecting piece correspond to the thickness of the box structure.

The connecting piece is preferably made of steel by casting, which steel has a yield strength of 1650-2000 $N/mm^2$. Thus the connecting piece is strong.

The crane according to the invention is characterized by a work machine, which includes a crane, a tool attached to the crane and conductors routed through the opening of the connecting piece and into the lifting boom, which crane is a crane according to the invention according to any of the aforementioned embodiments. By using the crane presented in this application the conductors can be routed inside the lifting boom of the crane.

Preferably conductors are hydraulic conductors.

BRIEF DESCRIPTION OF THE DRAWINGS

In the following, the invention is described in detail with reference to the accompanying drawings showing some embodiments of the invention, in which FIG. 4a shows the lifting boom of a crane according to the invention, seen separately from above, FIG. 4b shows the lifting boom of a crane according to the invention, seen separately from below, FIG. 5a shows the lifting boom of a crane according to the invention, seen separately from the side, FIG. 5b shows a side view of a cross-section A-A of FIG. 4b, FIG. 5c shows axonometrically a cross-section slightly to the side of the cross-section A-A of FIG. 4b, in which the support structures of the connecting piece are visible, FIG. 6a shows the connecting piece of a crane according to the invention, seen in the longitudinal direction of the lifting boom, FIG. 6b shows a cross-section B-B of FIG. 5a, seen in the longitudinal direction of the lifting boom.

DETAILED DESCRIPTION OF THE INVENTION

Figure 1A:
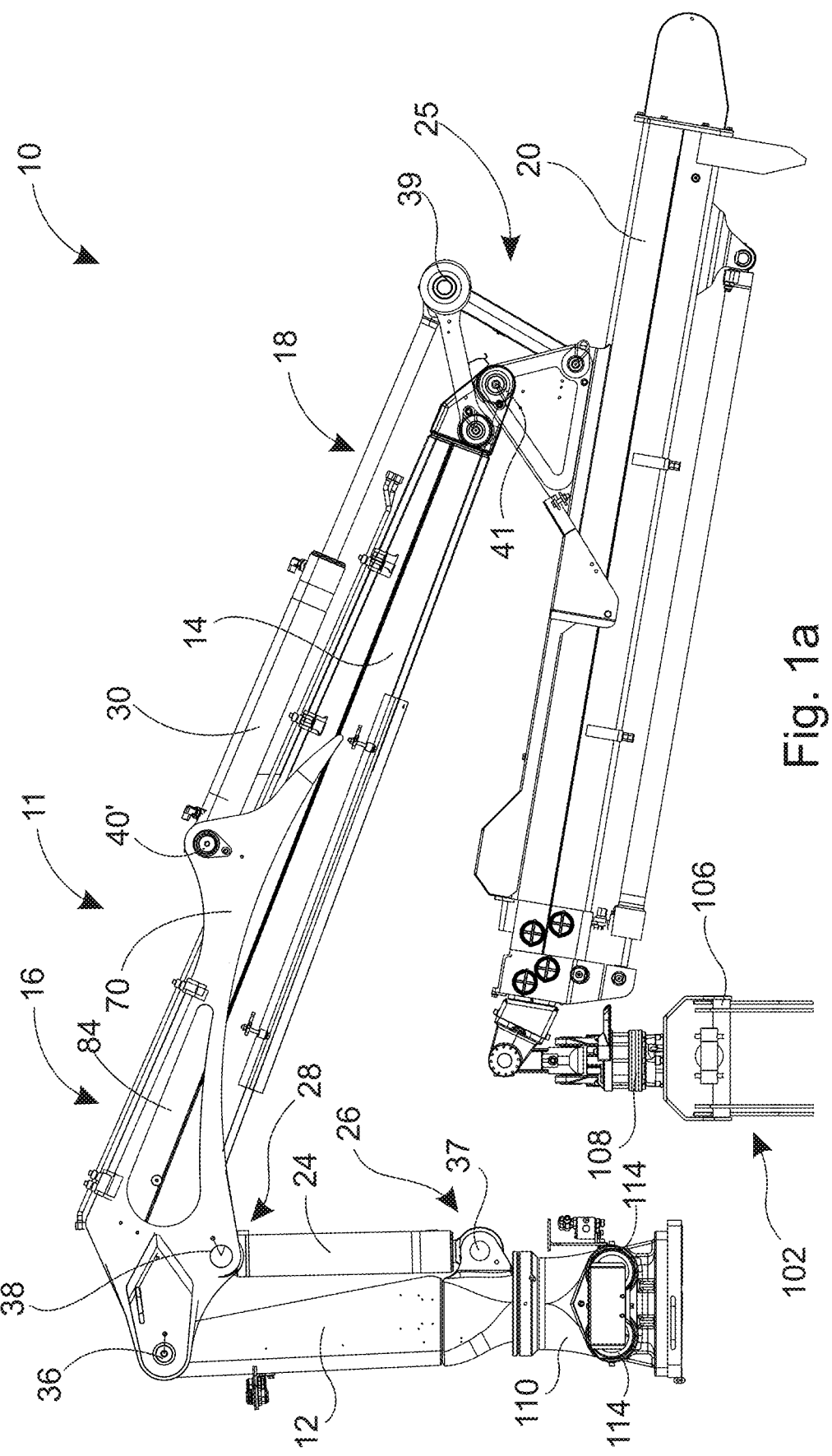
FIG. 1a shows a side view of a separate crane according to the prior art.
Figure 1B:
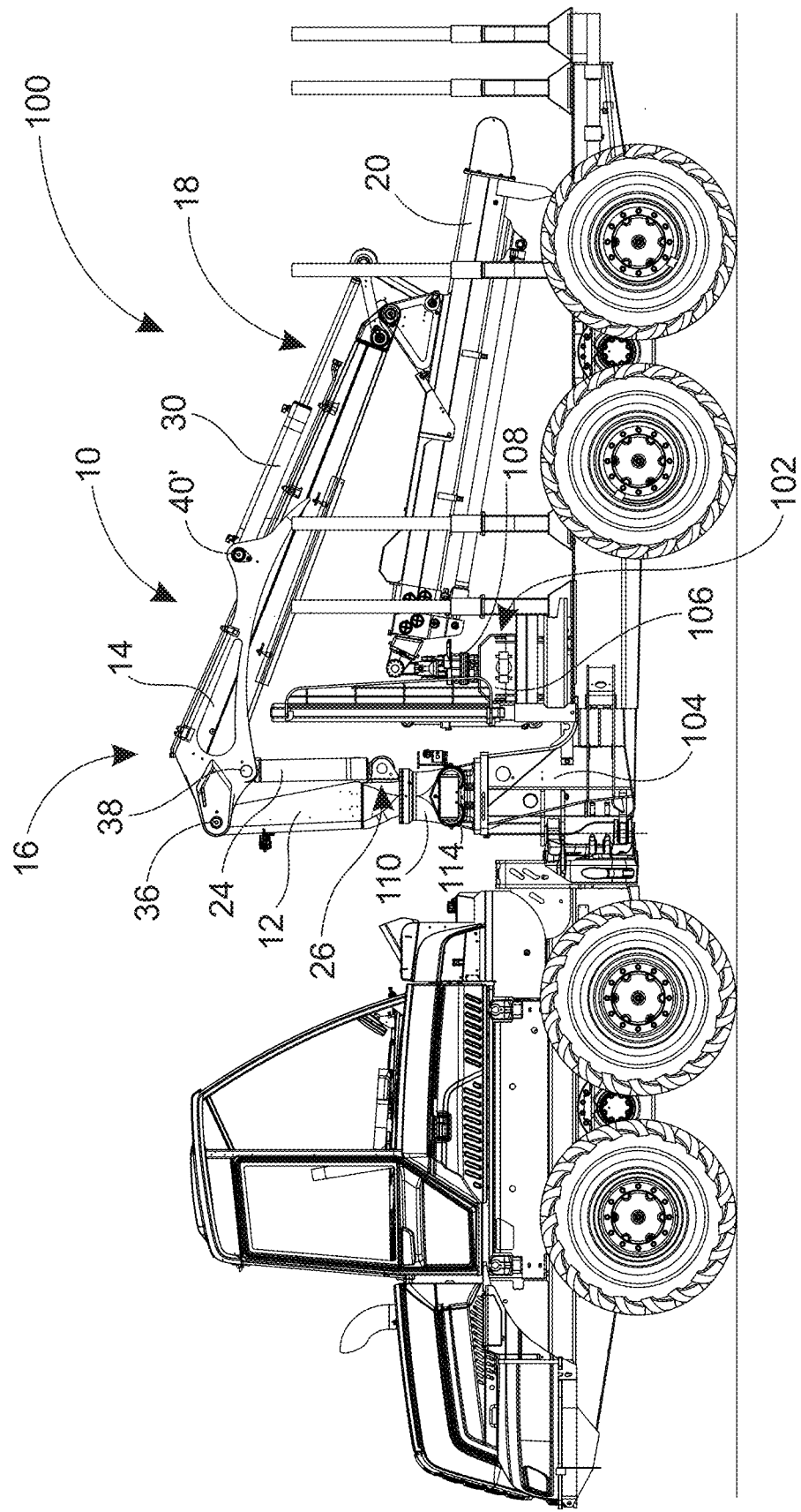
FIG. 1b shows a side view of a work machine according to the prior art, in which there is a crane according to the prior art.

FIG. 1b shows a work machine 100 according to the prior art, to which a crane 10 according to the prior art is attached. In the figure, the work machine 100 is a forest tractor. The crane 10 can be mounted on the chassis 104 of the work machine 100 and a tool 102 is preferably suspended from the crane 10 at the end of the crane's 10 folding boom 20. The folding boom 20 preferably also generally comprises an extension, which can be moved telescopically from inside the folding boom, using a linear movement in the longitudinal direction of the folding boom. The tool 102 can be, for example, a grab 106 according to FIG. 1b, or a harvester head, which is suspended from the folding boom 20 by means of a rotation device 108. It can be seen from FIG. 1b that the third pivot point 40' connecting the folding cylinder 30 to the lifting boom 14 is located quite far from the first pivot point 36 and the second pivot point 38, which are located at the first end 16 of the lifting boom 14.

Figure 2A:
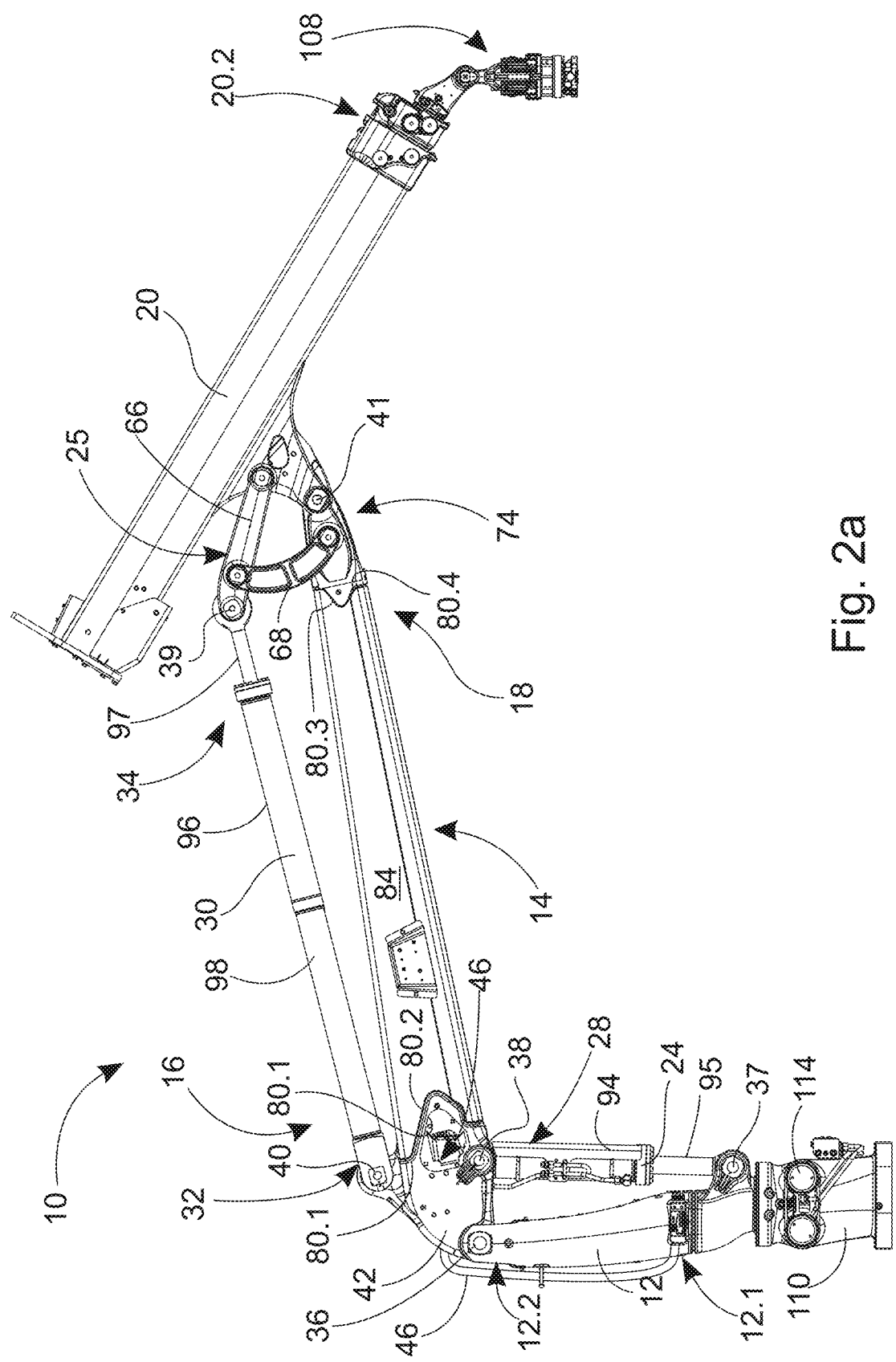
FIG. 2a shows a side view of a separate crane according to the invention.
Figure 2B:
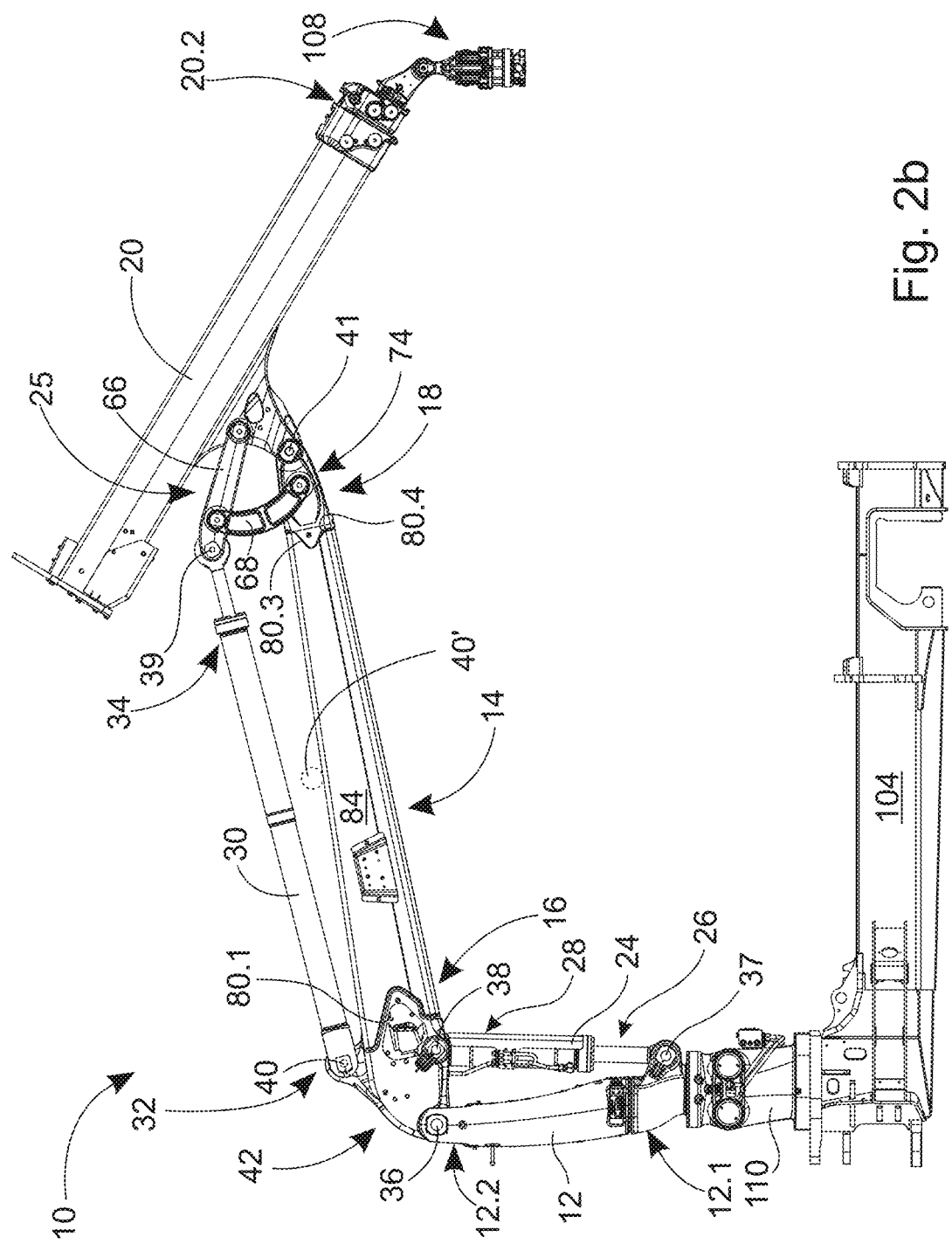
FIG. 2b shows a side view of a separate chassis of a work machine according to the invention, to which to crane according to the invention is attached.
Figure 2C:
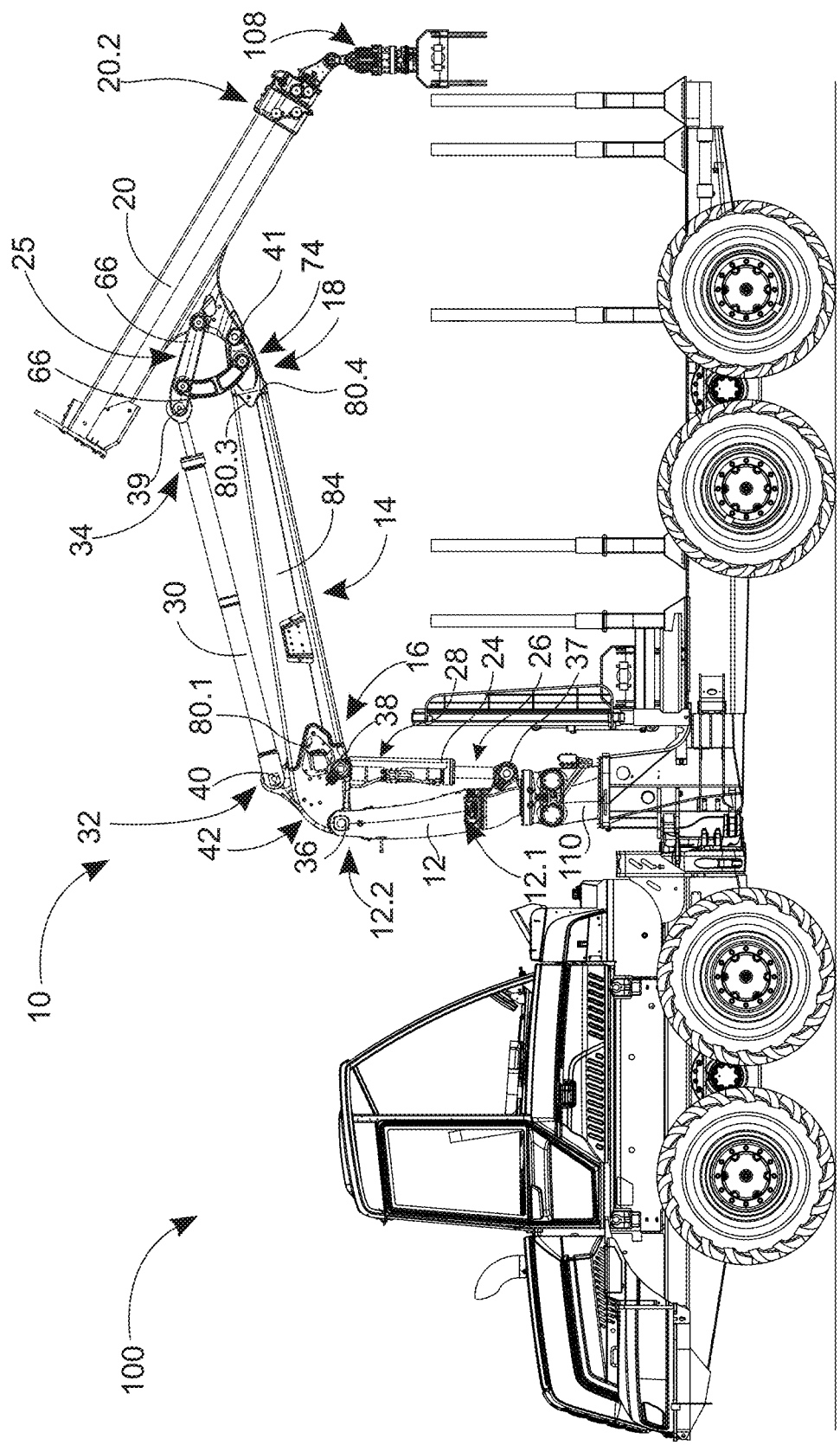
FIG. 2c shows a side view of a work machine according to the invention, to which the crane according to the invention is attached.

FIGS. 2a-2c show the crane 10 according to the invention. In FIG. 2b, the crane 10 is attached to the chassis 104 of the work machine according to the invention and in FIG. 2c in turn to a work machine 100 according to the invention. According to FIGS. 2a-2c, the crane 10 according to the invention includes a base 110, a pillar boom 12, a lifting boom 14, a folding boom 20, a lifting cylinder 24, and a folding cylinder 30. The lifting boom 14 includes a hollow cast connecting piece 42, in which at least the first pivot point 36 and second pivot point 38 are formed, and preferably also the third pivot point 40. When operating the crane 10, considerably greater forces act on the first pivot point 36 and second pivot point 38 than on the third pivot point, which can also be implemented with the aid of cuts according to the prior art directly on the lifting boom, as shown in FIG. 2b by the reference number 40'. In the present application, the term pivot point refers to pivot points the axes of rotation of which are, in the operating position essentially horizontal, or in other words transverse to the longitudinal direction of the pillar boom, the lifting boom, and the folding boom. In the crane 10 according to the invention, the lifting cylinder 24 preferably includes a jacket 94 and a piston rod 95 according to FIG. 2a. A third end 26 of the lifting cylinder 24 is formed in the piston rod 95 and a fourth end 28 in the jacket 94. The folding cylinder 30 includes a second jacket 96 and a second piston rod 97 and a fifth end 32 of the folding cylinder 30 is formed in the second jacket 96 and a sixth end 34 in the second piston rod 97. In this way using the crane large forces are produced when extending the lifting boom and folding boom.

The crane 10 is attached to the chassis 104 of the work machine 100 with the aid of a base 110 and the pillar boom 12 is attached rotatably, for example, to the base 110 on top of the chassis 104 of the work machine 100, from the ninth end 12.1 belonging to the pillar boom 12. The lifting boom 14, comprising a first end 16 and a second end 18, is pivoted to a tenth end 12.2 belonging to the pillar boom 12. The lifting boom 14 is pivoted from the first end 16 to the pillar boom 12 by means of pivot point 36. The folding boom 20 comprises two ends, with the aid of the eleventh end 20.2 of which a tool 108 is suspended on the folding boom 20 or on a telescopic extension to the folding boom (not shown in the figures). The folding boom 20 can be suspended in the middle with the aid of a pivot structure 25 at the second end 18 of the lifting boom 14. The pivot structure 25 can be an arrangement like that known from the prior art, in which the sixth end 34 of the folding cylinder 30 is connected with the aid of a fifth pivot point 39 to an intermediate arm 66, which is in turn pivoted at the tenth end to the folding boom 20 and between which ends a second intermediate arm 68 is pivoted, which is, in turn, pivoted from the twelfth end to the second connecting piece 74.

Between the pillar boom 12 and lifting boom 14 is pivoted a lifting cylinder 24 comprising the third end 26 and the fourth end 28, of which the third end 26 is pivoted to a fourth pivot point 37 belonging to the pillar boom 12 and the fourth end 28 in turn to the lifting boom's 14 second pivot point 38. The rotation of the lifting boom 14 around the first pivot point 36 relative to the pillar boom 12 is achieved with the aid of the lifting cylinder 24. Between the lifting boom 14 and the folding boom 20 is pivoted a folding cylinder 30 comprising the fifth end 32 and the sixth end 34, of which the fifth end 32 to the third pivot point 40 of the lifting boom 14 and the sixth end 34 is pivoted to the fifth pivot point 39 of the folding boom 20. The rotation of the folding boom 20 around the pivot point 41 of the folding cylinder of the lifting boom belonging to the lifting boom 14 relative to the lifting boom 14 is achieved with the aid of the folding cylinder 30. According to FIGS. 2a-2c, the folding cylinder 30 is preferably considerably longer than in the crane 10 according to the prior art of the embodiments of FIGS. 1a and 1b. This is due to the fact that in the crane 10 according to the invention the third pivot point 40 is closer to the first end 16 of the lifting boom 14, so that the folding cylinder 30 should be longer.

Figure 3:
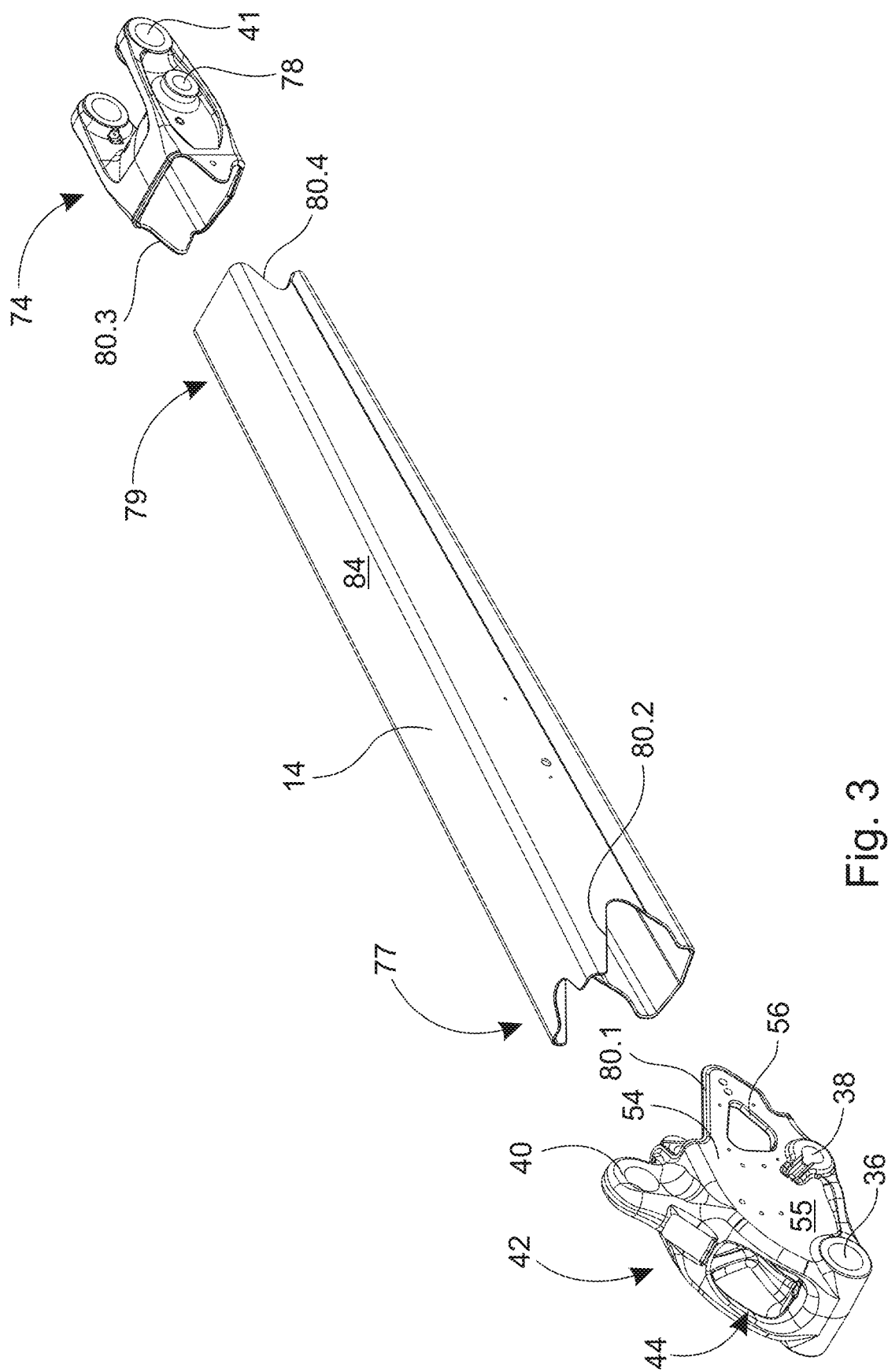
FIG. 3 shows the lifting boom of a crane according to the invention shown separately axonometrically, with the connecting piece and the second connecting piece separated.

Unlike in the prior art, in the crane according to the invention at least the first pivot point 36 and the second pivot point 38, as well as preferably also the third pivot point 40 are formed, according to FIG. 3 as part of a connecting piece 42, which is a hollow cast structure. In the crane 10 according to the invention the lifting boom 14 is preferably formed of three separate piece, namely the connecting piece 42, a second connecting piece 74 and a box structure 84 in between the connecting piece 42 and the second connecting piece 74. The welded box structure 84 of the lifting boom 14, known from the prior art, preferably terminates already before the first end 16 and the second end 18 of the lifting boom 14 and is continuous in the middle of the lifting boom 14, except for the ends 16 and 18. The box structure 84 has a seventh end 77 attached to the connecting piece 42 and eighth end 79 attached to the second connecting piece 74 shown in FIG. 3. In the prior art, the box structure 84, as a welded construction, has been continuous over the whole length of the lifting boom 14, so that the pivot points 36, 38, and 40 of the lifting boom's 14 first end 16 have had to be formed with the aid of separate welded wafers 70. In the crane 10 according to the invention, the connecting piece 42 is attached to the box structure 84 of the lifting boom 14, in order to form the first end 16 of the lifting boom 14. Preferably the second connecting piece 74 is attached to the box structure 84, thus forming the second end 18 of the lifting boom 14.

According to the invention, the connecting piece 42 is formed by casting, so that it is structurally strong. The connecting piece is preferably a single cast piece 54, but it can also be formed of two separate cast pieces, which are joined together preferably by welding. The connecting piece 42 preferably includes all the pivot points connecting to the first end 16 of the lifting boom 14, i.e. the first pivot point 36, the second pivot point 38, and the third pivot point 40. In addition, the connecting piece 42 also includes side walls 55, in which the second openings 56 are formed, and a surface part 55.1 and a bottom part 55.2 (shown in FIGS. 4a and 4b). Formed in the same cast piece, the forces between the pivot points 36, 38, and 40 are transmitted along the cast structure of the connecting piece 42 over quite a short distance, so that the lever arms of the forces are short and the torques acting on the connecting piece remain considerably smaller than in solutions of the prior art.

According to FIGS. 4a and 4b, the connecting piece 42 preferably includes an opening 44, through which the conductors 46 shown in FIGS. 2a and 5b can be led according to FIG. 2c from the pillar boom 12 through the lifting boom 14 to the folding boom 20 and through it to the tool 108. The opening 44 is preferably formed in such a way that it forms an opening in the channel-like structure formed by the box structure 84 of the lifting boom 14 at the first end 16 of the lifting boom 14. According to FIG. 4a, the opening 44 can be at a slight angle relative to the longitudinal transverse direction A of the lifting boom 14, when the perpendicular of the place of the opening 44 lies at a rearward slant relative to the lifting boom 14. According to FIG. 4a, the opening 44 is located on the surface of the connecting piece 42 between the first pivot point 36 and the third pivot point 40. In this connection, reference to conductors can mean electrical conductors, pressure-medium conductors, such as, for example, hydraulic hoses, or other medium conductors, such as colour-medium hoses. The opening 44 is round in shape and has rounded edges 45 shown in FIG. 6a.

In this connection it should be understood that, although in the application the crane's operating devices are described as hydraulic cylinders, which operate in practice hydraulically as part of the work machine's hydraulic system, other kinds of operating device can also be used as the operating devices. In the hydraulic cylinders the pressure medium, i.e. hydraulic fluid, is led into and out of the hydraulic cylinders, inside the system and controlled by the system. On the other hand, the operating devices can be electrical or electromechanical operating devices, by which a corresponding linear longitudinal movement is achieved. Further, alternatively the operating device can be a hydraulic cylinder, which comprises its own hydraulic circuit together with pumps and receives its energy as electricity along conductors. The hydraulic circuit is then controlled and operated electrically, when the system of the operating device operates by electrical energy and converts the electrical energy to a flow of pressure medium.

In addition to the opening 44, the connecting piece 42 preferably also includes the third opening 82 shown in FIG. 4b, which is located in the connecting piece 42 on the surface between the first pivot point 36 and the second pivot point 38, preferably in the bottom part 55.2 of the connecting piece 42. In other words, the third opening 82 is in the undersurface of the lifting boom 14, when the lifting boom 14 is horizontal. The third opening 82 preferably also forms a route, along which the fourth end 28 of the lifting cylinder 24 is placed inside the connecting piece 42 and attached through the connecting piece 42. The connecting piece 42 is then on both sides of the fourth end 28 of the lifting cylinder 24 and the fourth pivot point 37 is formed between the lifting cylinder 24 and the pillar boom 12. In other words, the connecting piece 42 forms a lug for the fourth end 28 of the lifting cylinder 24. The crane's booms rotate around a vertical axis with the aid of rotation cylinders 114 which are located in the base 110. The base is in turn attached to the chassis 104 of the work machine 100 and the pillar boom 12 rotates on top of the base 110.

FIG. 5a shows a side view of the lifting boom 14 of the crane according to the invention. FIG. 5a shows the connector surfaces 80.1 and 80.2 between the connecting piece 42 and the box structure 84 of the lifting boom 14, by means of which the connecting piece 42 and the box structure 84 are joined to each other. The connector surfaces 80.1 and 80.2 are preferably welded to each other, in order to create a permanent joint. The connector surfaces 80.1 and 80.2 are sinuous in the transverse direction relative to the longitudinal direction of the lifting boom 14, in order to create a long welded seam, the length of which and the curves appearing in it, i.e. the points 80.5, prevent rapid changes in the stiffness in the lifting boom 14 in the longitudinal direction of the lifting boom. The second connecting piece 74 too can be attached to the box structure 84 of the lifting boom 14 with the aid of a sinuous connector surface 80.3 and 80.4. The second connecting piece 74 preferably includes a fourth opening 75 shown in FIGS. 4a and 4b through which the conductors 46 routed inside the lifting boom 14 through the opening 44 can be led out of the lifting boom and onwards to the folding boom 20.

According to FIG. 5a, the side walls 55 of the connecting piece 42 can include second openings 56 for connecting the connections 90 of the conductors 46 shown in FIG. 5b. In other words, the plane of the second opening 56 is vertical. With the aid of the second opening 56, the operator can easily connect the connectors 90 of the conductors 46 coming from the pillar boom 12 to the conductors 46 running through the lifting boom 14, as the connectors 90 can be easily accessed through the second opening 56. When referring to the second opening 56 it should be understood that on both sides of the connecting piece 42 there is a single second opening, so that at this point in the connecting piece 42 a direct connection is formed through the connecting piece 42 in the transverse direction of the lifting boom 14. Here it should also be understood that the openings of the connecting piece 42, i.e. the opening 44, the second opening 56, and the third opening 82 all also lighten the weight of the connecting piece 42 and bring savings in materials. The surroundings of the openings are strengthened with reinforcements, which can be formed, for example, by using a thicker material around the openings than elsewhere in the connecting piece.

FIG. 5b shows a side view of the lifting boom 14 of the crane according to the invention and as a cross-section along the centre line A-A of FIG. 4b. FIG. 5c shows a cross-section C-C slightly to the side of centre line A-A. According to FIG. 5c, on both side walls 55 of the connecting piece 42 relative to the centre line A-A of the lifting boom 14 a support structure 52 is formed between at least two pivot points 36, 38, and 40, which reinforces the connecting piece 42 and acts as a force-transmitting element in the connecting piece 42. More specifically, the support structure 52 is preferably a thicker layer of material than the thinner structures of the connecting piece, which when transmitting forces connects at least two pivot points to each other. According to one embodiment, all the pivot points are mutually joined together by the support structures. More specifically, the surrounding of the openings of the shaft of each pivot point is a reinforced structure, in which the material thickness is greater. The support structure 52 is also clearly visible in FIG. 5c, in which the longitudinal cross-section of the lifting boom 14 is made along the cross-section C-C of FIG. 6a next to the centre line.

Returning to FIG. 5a, the location of the first pivot point 36, the second pivot point 38, and the third pivot point 40 in the connecting piece 42 is preferably such that, seen from the side the pivot points 36, 38, and 40 form a triangle 60, which is shown in the figure by broken lines. The triangle's 60 largest angle α, which is at the second pivot point 38 can be at most 120°, but preferably 60-100°, most preferably 75-90°, the locations of the first pivot point 36 and the third pivot point 40 determining the magnitude of the angle. The pivot points 36, 38, and 40 are then located close to each other, thus permitting smaller external dimensions of the connecting piece 42 and thus shorter moment arms in the case of the forces acting on the connecting piece through the various pivot points. In the case of the second pivot point 38 the angle of the triangle 60 is preferably 85-95°. The second pivot point 38 and the third pivot point 40 are then essentially on top of each other vertically when the lifting boom 14 is horizontal. This in turn permits the creation of a sufficiently large opening 44 between the first pivot point 36 and the third pivot point 40 and the placing of the third pivot point 40 slightly closer to the folding boom 20. The placing of the third pivot point 40 closer to the folding boom 20 for its part permits a slightly shorter structure in the folding cylinder 30.

Figure 5D:
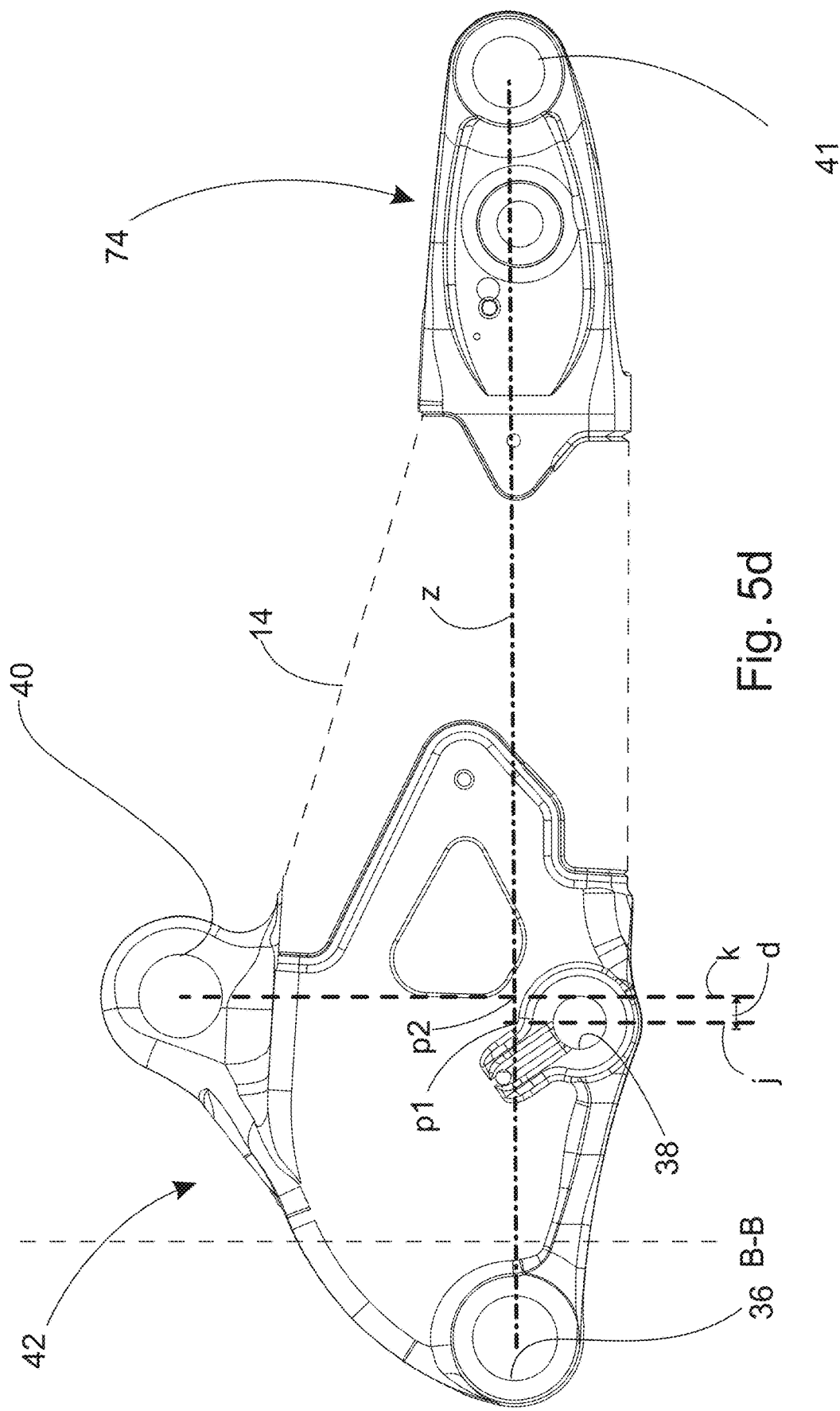
FIG. 5d shows a schematic diagram of the location of the pivot points relative to each other in the connecting piece, when the connecting piece and the second connecting piece are shown exaggeratedly close to each other.

In FIG. 5d, the connecting piece 42 and the second connecting piece 74 are shown as being exaggeratedly close to each other, so that the intersection point p1 and p2 of the line z between the first pivot point 36 and the pivot point 41 of the folding boom of the lifting boom and the line segments j and k drawn perpendicularly to it from the second pivot point 38 and the third pivot point 40 can be clearly seen. In reality, the connecting piece 42 and the second connecting piece 74 are far from each other, according to FIGS. 5a and 5b. According to the figure, the distance d between the intersection points j and k is preferably 0-20% of the length of line z.

According to FIGS. 1b and 2b, in the crane 10 according to the invention the folding cylinder 30 is longer than in cranes 10 according to the prior art, as the attachment of the folding cylinder 30 to the third pivot point 40 of the lifting boom 14 is located in the crane 10 according to the invention closer to the first end of the lifting boom 14 that in cranes according to the prior art. The displacement of the folding cylinder can correspond to that in the prior art, but the folding cylinder 30 preferably includes an extension 98 according to FIG. 2a, so that the folding cylinder 30 reaches the third pivot point 40 of the connecting piece 42.

Preferably, the connecting piece of the crane according to the invention has a length of 50-100 cm, a width of 20-50 cm, and a height of 50-80 cm. The thickness of the sides of the connecting piece can be, for example, 10-25 mm. The steel used can be, for example, steel manufacture by the Swedish company SSAB and known under product name Strenx 650, or similar, which has a yield strength of 1650-2000 N/mm². The connecting piece can be made by core casting. In the casting stage of the connecting piece, the mould preferably includes two halves, of which in the first there is a mould and core, and in the second the second half of the mould. In casting, the core is supported through openings inside the hollow pieces with the aid of sand pins, and when the cast connecting piece has hardened the core is vibrated out from inside the hollow pieces. The holes do not weaken the connecting piece's structure, as they are located at places where large stresses naturally do not form.

Figure 7:
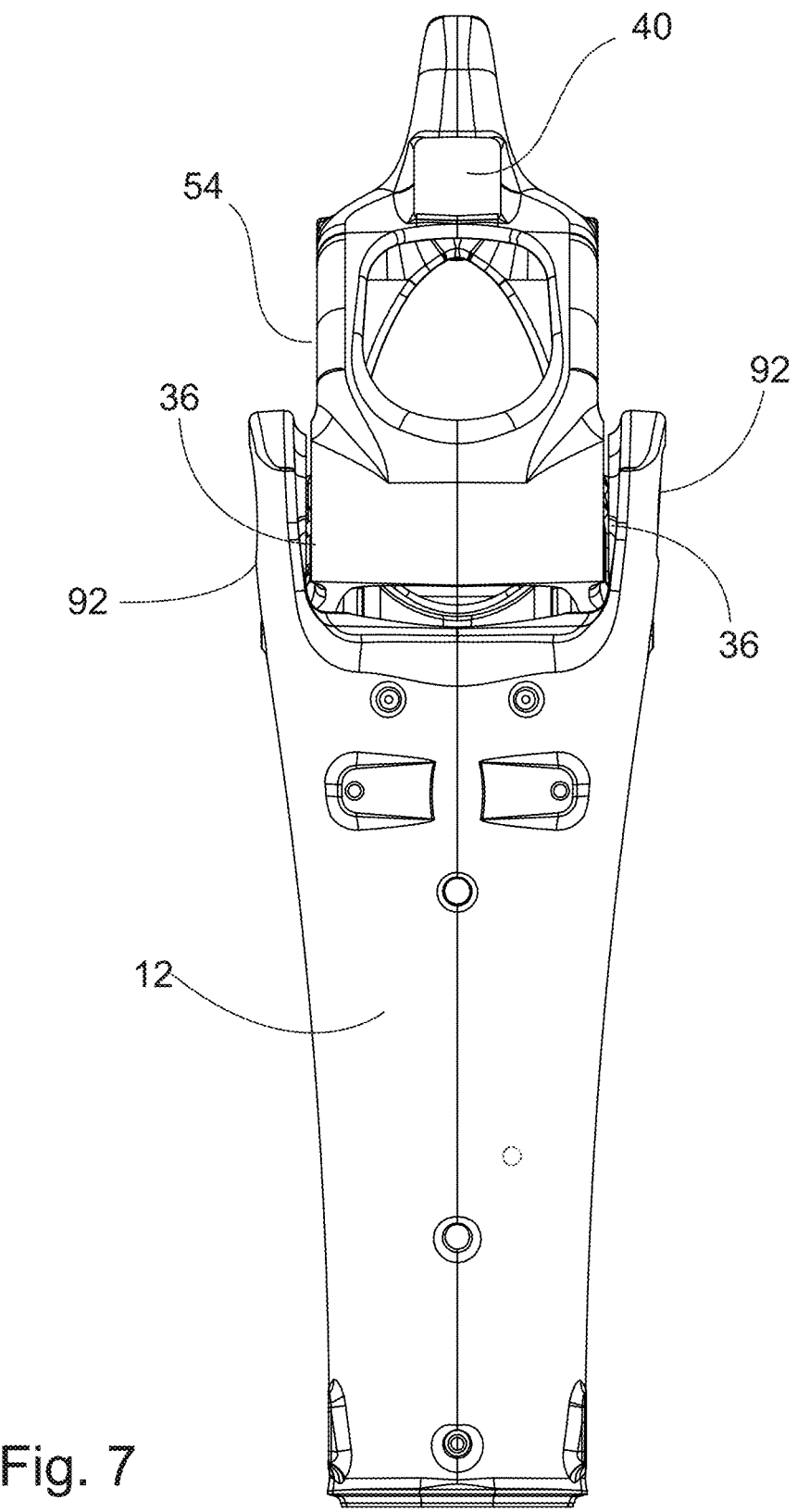
FIG. 7 shows the attachment of the first pivot point between the lifting boom and the vertical boom, in the direction of the lifting boom.

According to FIGS. 2a-2c, the fourth end 28 of the lifting cylinder 24 is attached to the second pivot point 38 of the connecting piece 42, which is fork-shaped, i.e. the fourth end of the lifting cylinder 24 goes inside the connecting piece. On the other hand, the first pivot point 36 and the third pivot point 40 are, in turn, lug-shaped, i.e. the tenth end 12.2 of the pillar boom 12 includes, according to FIG. 7, a fork 92, which is intended to receive moments acting on the lifting boom. The fork is 150-500 mm, preferably 250-350 mm wide. With the aid of the wide fork, the moments acting on the lifting boom are effectively transferred to the pillar boom with the aid of the stiff connecting piece.

The crane's lifting boom's length can be 150-300 cm, its height 15-30 cm, and its width 20-40 cm. The folding boom can be of the same order of size as the lifting boom. For its part, the pillar boom can be 100-200 cm long, 20-50 cm wide, and 15-30 cm high, is the pillar boom is set horizontally.

In the work machine according to the invention, the crane is controlled using a valve block and control unit belonging to a work machine or crane according to the prior art, with the aid of which the flow of hydraulic oil to the lifting and folding cylinders is controlled. The lifting and folding cylinders are preferably controlled separately.

The crane according to the invention can be used, for example, in forester machines, which can be work machines using a harvester, or forwarders, but also in other applications, such as, for example, in connection with grabs.

The invention claimed is:

1. A crane arrangement, comprising:
   a crane; and
   a base for attaching the crane to a work machine;
   the crane comprising:
   a pillar boom attached rotatably to the base,
   a lifting boom comprising a first end and a second end, a hollow cast connecting piece arranged at the first end of the lifting boom, and a welded hollow box structure connected to the hollow cast connecting piece and including the second end of the lifting boom, wherein both the hollow cast connecting piece and the welded hollow box structure include connector surfaces joining each to the other, the lifting boom being pivoted at the first end to the pillar boom;
   a folding boom comprising two ends, the folding boom being pivoted at the second end of the lifting boom to suspend a tool from the crane;

a lifting cylinder comprising a third end and a fourth end, the lifting cylinder being pivoted at the third end in connection with the pillar boom and at the fourth end to the lifting boom to operate the lifting boom, a folding cylinder comprising a fifth end and a sixth end, the folding cylinder being pivoted at the fifth end to the lifting boom and at the sixth end pivoted to the folding boom to operate the folding boom, wherein the hollow cast connecting piece comprises a first pivot point connecting the pillar boom to the lifting boom and receiving moments acting on the lifting boom, a second pivot point connecting the lifting cylinder to the lifting boom, and a third pivot point connecting the folding cylinder to the first end of the lifting boom and wherein at least the first pivot point, the second pivot point and the third pivot point are arranged at the hollow cast connecting piece and the hollow cast connecting piece includes an opening for routing conductors through the hollow cast connecting piece into the welded hollow box structure of the lifting boom, wherein the opening in the hollow cast connecting piece is arranged in a surface of the hollow cast connecting piece between the first pivot point and the third pivot point and a plane of the surface surrounding the opening is parallel to axes of rotation of the fisrt, second and third pivot points to provide open access to the welded hollow box structure at the first end of the lifting boom; and wherein the pillar boom comprises a fork attaching the pillar point to the first pivot point around the connecting piece.

2. The crane arrangement according to claim 1, wherein the second pivot point and third pivot point are arranged relative to a line between the first pivot point and a pivot point of the folding boom belonging to the second end of the lifting boom in such a way that a distance between a first intersection point of the line with a line segment perpendicular to the line and running through the second pivot point and a second intersection point of the line with a line segment perpendicular to the line and running through the third pivot point is 0-20% of a length of the line between the first pivot point and the pivot point of the folding boom.

3. The crane arrangement according to claim 2, wherein the first intersection point is between the second intersection point and the first pivot point.

4. The crane arrangement according to claim 2, wherein the second and third pivot points are located on opposite sides of the line.

5. The crane arrangement according to claim 1, wherein the second pivot point and third pivot point are arranged relative to a line between the first pivot point and a pivot point of the folding boom belonging to the second end of the lifting boom in such a way a distance between a first intersection point of the line with a line segment running through the second pivot point and perpendicular to the line and a second intersection point of the line with a line segment running through the third pivot point and perpendicular to the line is 8-15% of a length of the line between the first pivot point and the pivot point of the folding boom.

6. The crane arrangement according to claim 5, wherein a distance between the first and second intersection points is 5-15% of the length of the line.

7. The crane arrangement according to claim 1 wherein the hollow cast connecting piece comprises side walls, each of which have at least two support structures between the first pivot point, the second pivot point and the third pivot point, each of which support structures connects the first pivot point, the second pivot point and the third pivot point to each other on same side wall.

8. The crane arrangement according to claim 1 wherein the hollow cast connecting piece is a unified cast piece.

9. The crane arrangement according to claim 1 wherein the hollow cast connecting piece is formed by combining at least two cast pieces.

10. The crane arrangement according to claim 1 wherein the hollow cast connecting piece includes opposing side walls, each side wall having an opening to provide access for handling and connecting connectors of the conductors to lines contained in the lifting boom.

11. The crane arrangement according to claim 1, wherein the hollow cast connecting piece is made of steel by casting, which steel has a yield strength of 1650-2000 N/mm$^2$.

12. The crane arrangement according to claim 1 wherein the lifting cylinder includes a jacket and a piston rod and the third end of the lifting cylinder is formed in the piston rod and the fourth end in the jacket and the folding cylinder includes a second jacket and a second piston rod and the fifth end of the folding cylinder is formed in the second jacket and the sixth end in the second piston rod.

13. The crane arrangement according to claim 1, wherein the first pivot point is farther from the second end of the lifting boom than the second pivot point and third pivot point.

14. The crane arrangement according to claim 1, wherein the folding cylinder includes an extension for connecting the folding cylinder to the third pivot point of the hollow cast connecting piece.

15. The crane according to claim 1, comprising a third opening arranged in a surface of the hollow cast connecting piece between the first pivot point and the second pivot point, a plane of the surface surrounding the third opening being parallel to axes of rotation of the first pivot point, the second pivot point and the third pivot point, wherein the fourth end of the lifting cylinder is attach through the third opening to the second pivot point of the hollow cast connecting piece of the lifting boom.

16. The crane according to claim 1, wherein the opening is round and has rounded edges.

17. A work machine, comprising:
the crane arrangement according to claim 1;
a tool attached to the crane; and
conductors routed through the opening of the hollow cast connecting piece and into the lifting boom.

18. The work machine according to claim 17, wherein the conductors are hydraulic conductors.

* * * * *